United States Patent
Robertson et al.

(10) Patent No.: US 9,131,018 B2
(45) Date of Patent: Sep. 8, 2015

(54) SOCIAL MEDIA DATA PLAYBACK SYSTEM

(71) Applicant: Dedo Interactive, Inc., Plano, TX (US)

(72) Inventors: Homer Paul Robertson, Plano, TX (US); Douglas Stephen McCluer, Allen, TX (US); Catherine Dickens Kirkpatrick, Dallas, TX (US); Zachary Edward Brackin, The Colony, TX (US); Daniel Adam Dura, Garland, TX (US)

(73) Assignee: Dedo Interactive, Inc., Plano, TX (US)

( * ) Notice: Subject to any disclaimer, the term of this patent is extended or adjusted under 35 U.S.C. 154(b) by 319 days.

(21) Appl. No.: 13/667,480

(22) Filed: Nov. 2, 2012

(65) Prior Publication Data

US 2013/0304828 A1 Nov. 14, 2013

Related U.S. Application Data

(60) Provisional application No. 61/554,581, filed on Nov. 2, 2011.

(51) Int. Cl.
| | |
|---|---|
| *H04L 29/06* | (2006.01) |
| *G06F 17/30* | (2006.01) |
| *G06Q 50/00* | (2012.01) |
| *G06Q 10/10* | (2012.01) |

(52) U.S. Cl.
CPC ........ *H04L 65/403* (2013.01); *G06F 17/30861* (2013.01); *G06F 17/30873* (2013.01); *G06F 17/30893* (2013.01); *G06F 17/30994* (2013.01); *G06Q 10/10* (2013.01); *G06Q 50/01* (2013.01)

(58) Field of Classification Search
CPC ................... G06F 17/30861; G06F 17/30873; G06F 17/30893; G06F 17/30994

USPC .......... 709/226, 217, 218, 219; 707/740, 705; 705/319, 10; 725/25, 34; 715/848, 736, 715/716

See application file for complete search history.

(56) References Cited

U.S. PATENT DOCUMENTS

| | | | |
|---|---|---|---|
| 2009/0048904 A1* | 2/2009 | Newton et al. | 705/10 |
| 2010/0094849 A1* | 4/2010 | Rose et al. | 707/705 |
| 2010/0312769 A1* | 12/2010 | Bailey et al. | 707/740 |
| 2011/0047479 A1 | 2/2011 | Ghosh | |
| 2012/0036085 A1 | 2/2012 | Srivastava et al. | |
| 2012/0047219 A1 | 2/2012 | Feng et al. | |
| 2012/0054610 A1* | 3/2012 | Archer | 715/716 |
| 2012/0060096 A1* | 3/2012 | Makam et al. | 715/736 |
| 2012/0084812 A1* | 4/2012 | Thompson et al. | 725/34 |
| 2012/0174037 A1* | 7/2012 | Relyea et al. | 715/848 |
| 2012/0226808 A1* | 9/2012 | Morgan | 709/226 |
| 2012/0291059 A1* | 11/2012 | Roberts et al. | 725/25 |
| 2013/0024389 A1* | 1/2013 | Gupta | 705/319 |

* cited by examiner

*Primary Examiner* — Le H Luu
(74) *Attorney, Agent, or Firm* — Westman, Champlin & Koehler, P.A.; Theodore M. Magee (57) ABSTRACT

A method of displaying social media data is provided. The method includes accessing stored social media data from a plurality of social media outlets and obtaining social media data having associated context information. The obtained social media data includes at least first social media data from a first social media outlet and second social media data from a second social media outlet. The method includes providing a user interface that displays representations of the first and second social media data as a function of the context information.

13 Claims, 8 Drawing Sheets

SOCIAL MEDIA DATA PLAYBACK SYSTEM

CROSS-REFERENCE TO RELATED APPLICATION

The present application is based on and claims the benefit of U.S. provisional patent application Ser. No. 61/554,581, filed Nov. 2, 2011, the content of which is hereby incorporated by reference in its entirety.

BACKGROUND

Social media has become increasingly popular as it expedites conversation relative to traditional media and permits users to instantly obtain and share information. As a result, many types of social media outlets exist that provide large sources of social media information. Examples of social media outlets include, but are not limited to, social sharing sites, social networks, blogs, microblogs, Internet forums, newsfeeds, wikis, podcasts, and any other platforms through which individuals, organizations, and/or communities create, organize, and/or share content. A social network, for example, is typically provided through an online site, service, or platform that focuses on facilitating the building of social structures, networks, or relations among individuals or organizations who may share interests, activities, backgrounds, or real-life connections, for example.

In many social networking sites, each user (such as an individual or organization) is represented by a profile and is connected to other users by specific types of social interdependency. For example, categories can be used to connect the user with relatives, friends, classmates, co-workers, etc. Through the social networking site, the user can share information (for example, by posting a message, uploading a picture or video, linking to another source of information, etc.) about their ideas, opinions, events, interests, and/or current activities.

The discussion above is merely provided for general background information and is not intended to be used as an aid in determining the scope of the claimed subject matter. The claimed subject matter is not limited to implementations that solve any or all disadvantages noted in the background.

SUMMARY

In exemplary embodiments, the present disclosure provides social media data playback systems and methods. In one embodiment, social media data from one or more social media outlets is collected and stored. The data may optionally be annotated with additional information such as, but not limited to, context information. In certain embodiments, a social media dashboard application enables users to view the stored data. For instance, a dashboard application may have a user interface that enables users to view data from previous time frames using playback controls.

In one exemplary embodiment, a method of displaying social media data is provided. The method includes accessing stored social media data from a plurality of social media outlets and obtaining social media data having associated context information. The obtained social media data includes at least first social media data from a first social media outlet and second social media data from a second social media outlet. The method includes providing a user interface that displays representations of the first and second social media data as a function of the context information.

In one exemplary embodiment, a social media playback system is provided and includes a processor and processor executable instructions. The instructions configure the system to access a database storing social media data from a plurality of social media outlets, retrieve social media data from at least two different social media outlets, provide a user interface for rendering the retrieved social media data, and display one or more playback controls to control rendering of the retrieved social media data in the user interface.

In one exemplary embodiment, a computer readable storage medium storing instructions is provided. The instructions, when executed by a processor, perform a method including obtaining social media data comprising messages from at least one social media outlet, displaying a representation of each message in a user interface, and receiving a user input that selects at least one of the representations. The method includes providing additional context information pertaining to the message associated with the representation selected by the user input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Figure 1:
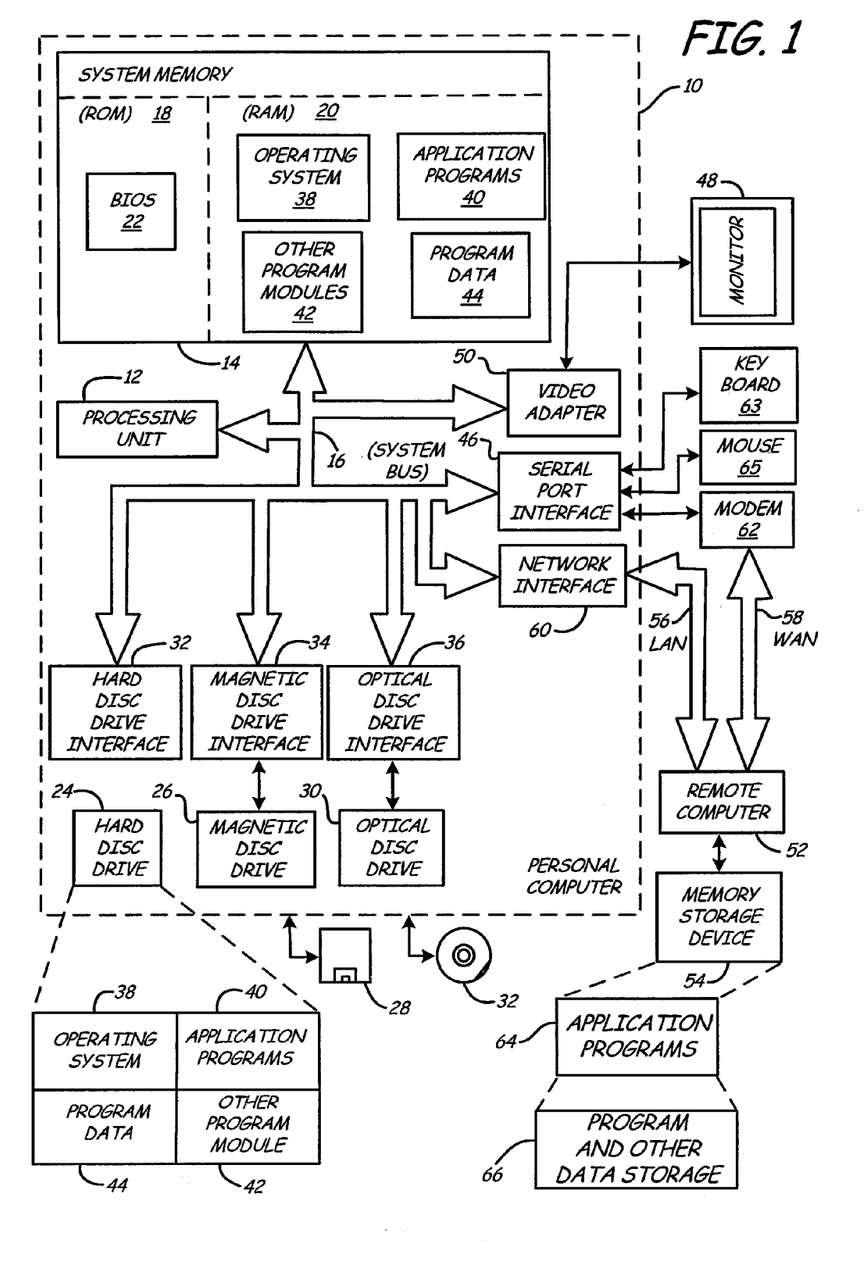
FIG. 1 is a block diagram of an exemplary computer system.

Embodiments of the present invention may illustratively be applied in the context of a computer system. FIG. 1 is a block diagram of an exemplary computer system within which embodiments of the present invention may be implemented. The system includes a computing device in the form of a conventional personal computer 10, including but not limited to a processing unit 12, a system memory 14 and a system bus 16 that couples the system memory 14 to the processing unit 12. In the illustrated example, processing unit 12 is a computer processor with associated memory and timing circuitry (not separately shown) that is a functional part of the system and is activated by, and facilitates functionality of other components or parts of the system. System bus 16 may be any suitable type of bus structure including a memory bus or controller, a peripheral bus, and a local bus. Some exemplary bus architectures include, but are not limited to, Peripheral Component Interconnect (PCI), Micro Channel Architecture (MCA), Industry Standard Architecture (ISA), and Micro Channel Architecture (MCA).

Personal computer 10 can include a variety of computer readable media. By way of example, computer readable media can be any removable or non-removable media accessible by computer 10 and can be volatile or nonvolatile. Computer readable media includes computer readable storage media and computer readable communication media.

Computer readable storage media includes hardware storage media and can be implemented in any method or technology for storage of information such as, but not limited to, computer readable instructions, program modules, data structures, or other data. Computer readable storage media does not include and is different from a carrier wave or modulated data signal. Examples include, but are not limited, read only memory (ROM), random access memory (RAM), EEPROM, flash memory, optical or magnetic storage devices, and the like.

Communication media can include wired and/or wireless media, such as a wired and/or wireless network or connection. Communication media typically includes delivery media and embodies data such as computer readable instructions, program modules and data structures in a transport mechanism. A modulated data signal, for example, encodes information by setting or changing characteristics of the signal.

System memory 14 includes computer storage media such as ROM 18 and RAM 20. A basic input/output system 22 (BIOS), containing the basic routines that help to transfer information between elements within the personal computer 10, is stored in ROM 18. RAM 20 can store program modules and data being operated on by processing unit 12.

Computer 10 can include other computer storage media. In the illustrated example, computer 10 further includes a hard disc drive 24, a magnetic disc drive 26, and an optical disc drive 30. Magnetic disc drive 26 can illustratively be utilized to read from or to write to a removable disc 28. Optical disc drive 30 can illustratively be utilized for reading data from (or writing data to) optical media, such as a CD-ROM disc 32. The hard disc drive 24, magnetic disc drive 26 and optical disc drive 30 are connected to the system bus 16 by a hard disc drive interface 32, a magnetic disc drive interface 34, and an optical disc drive interface 36, respectively. The drives and their associated computer-readable media provide nonvolatile storage for the personal computer 10. Other types of media that are readable by a computer may also be used in the exemplary operation environment.

A number of program modules may be stored in the drives and RAM 20, including an operating system 38, one or more application programs 40, other program modules 42 and program data 44. In particular, one or more of the other program modules 42 can illustratively be part of an social media data playback system for facilitating a social media data playback system. For example, the system can include features consistent with one or more dashboard application features that are part of embodiments of the present disclosure described below in greater detail with reference to other Figures.

In the illustrated example, input devices including a keyboard 63 and a mouse 65 are functionally connected to system bus 16 through a serial port interface 46 that is coupled to system bus 16. Input devices could be connected utilizing other interfaces such as a universal serial bus (USB), parallel port, and/or game port. Other examples of input devices include, but are not limited to, microphones, pointing devices, touch screens, touch pads, trackballs, scanners, joysticks, game controllers, and the like. Monitor 48 is connected to the system bus 16 through a video adapter 50. Other peripheral output devices (e.g., speakers or printers) could also be included but have not been illustrated.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 1. The network connections depicted in FIG. 1 include a local area network (LAN) 56 and a wide area network (WAN) 58, such as the Internet. Such network environments are commonplace in the art. The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the serial port interface 46. These are but examples of network implementations within the scope of the present disclosure.

In a networked environment, program modules depicted relative to the personal computer 10, or portions thereof, may be stored in the remote memory storage device 54. For example, application programs 64 may be stored utilizing memory storage device 54 and may include at least a portion of a social media data playback system for facilitating the presentation of social media data, embodiments of which will described below in greater detail below with reference to other Figures. In addition, data associated with an application program, such as the playback system consistent with embodiments of the present disclosure, may illustratively be stored within data storage 66. Data storage 66 is associated with memory storage device 54 (alternatively, or in combination, the application data may be stored within one of the data storage locations associated with computer 10). It will be appreciated that the network connections shown in FIG. 1 are exemplary and other means for establishing a communications link between the computers, such as a wireless interface communications link, may be used.

Embodiments may be applied in the context of computer systems other than the FIG. 1 personal computer 10. Other appropriate computer systems include handheld devices, tablet devices, multi-touch input devices, e-reader devices, any other consumer electronic device, mainframe computers, multi-processor systems, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present disclosure may be accomplished utilizing either local or remote storage devices, or simultaneously utilizing both local and remote storage devices.

Notwithstanding the broad applicability of the principles described above, it should be understood that the configuration of the exemplary embodiment as an application program that is stored on, and enables data to be stored on, a remote computer such as remote computer 52 provides significant advantages. For example, such a configuration minimizes the functional requirements (e.g., storage capacity) of personal computer(s) 10 and enables a broader range of potential adaptive control features, simplified system updating and upgrading features, and also simplified debugging and troubleshooting features.

Figure 2:
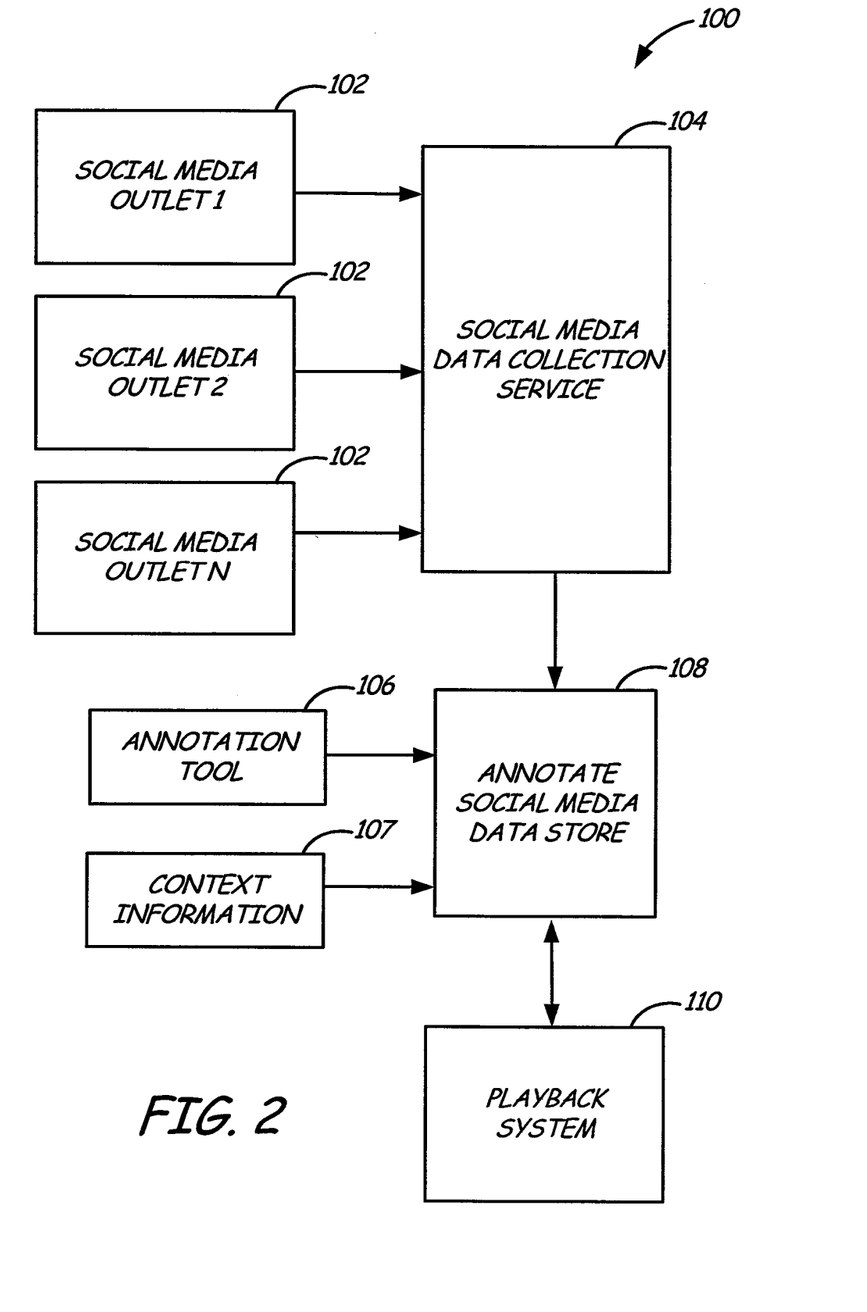
FIG. 2 is a block diagram of some components that may be utilized in implementing a social media playback system, under one embodiment.

FIG. 2 shows a block diagram 100 of some components that may be utilized in implementing a social media playback system. The components optionally include one or more social media outlets 102, a social media data collection service 104, an annotation tool 106, an annotated social media data store 108, and a social media playback system 110.

"Social media" is used herein in a broad sense and includes any information that a user (e.g., an individual, an organization, a community, etc.) creates, organizes, shares or otherwise makes available to other users in a social context. The media can include, but is not limited to, status messages, broadcast messages, directed messages, audio files, video files, image files, and the like.

Some examples of social media outlets 102 providing social media data include, but are not limited to, newsfeeds, wikis, podcasts, Internet forums, blogs, microblogs (such as Twitter®, Tumblr®, etc.), social sharing sites (such as YouTube®, Flickr®, etc.) and social networks (such as Facebook®, Myspace®, LinkedIn®, Google+®, etc.), and the like. Embodiments are not, however, limited to any particular type of social media data or social media outlet, and embodiments may collect data/information from any one or more sources. Additionally, in other embodiments, the data may not necessarily include social media data and can include any type of data.

The data from the plurality of outlets 102 is collected and stored by social media data collection service 104. In this manner, social media data collection service 104 illustratively conglomerates data from a plurality of social media sources. In one embodiment, an annotation tool 106 is utilized to annotate the data, and the annotated data is illustratively stored in an annotated social media data store 108. The data may be annotated with any information. The data may be annotated for example with context information 107 such as, but not limited to, keywords, geographical information, dates/times, user information, social media outlet identifying information, etc. In some embodiments, the annotation tool 106 may have analytical capabilities such that it is able to analyze the data to identify context/annotation information itself (e.g. high frequency words, keywords, related topics, etc.), and the annotation tool 106 then annotates the data with that information.

Figure 3:
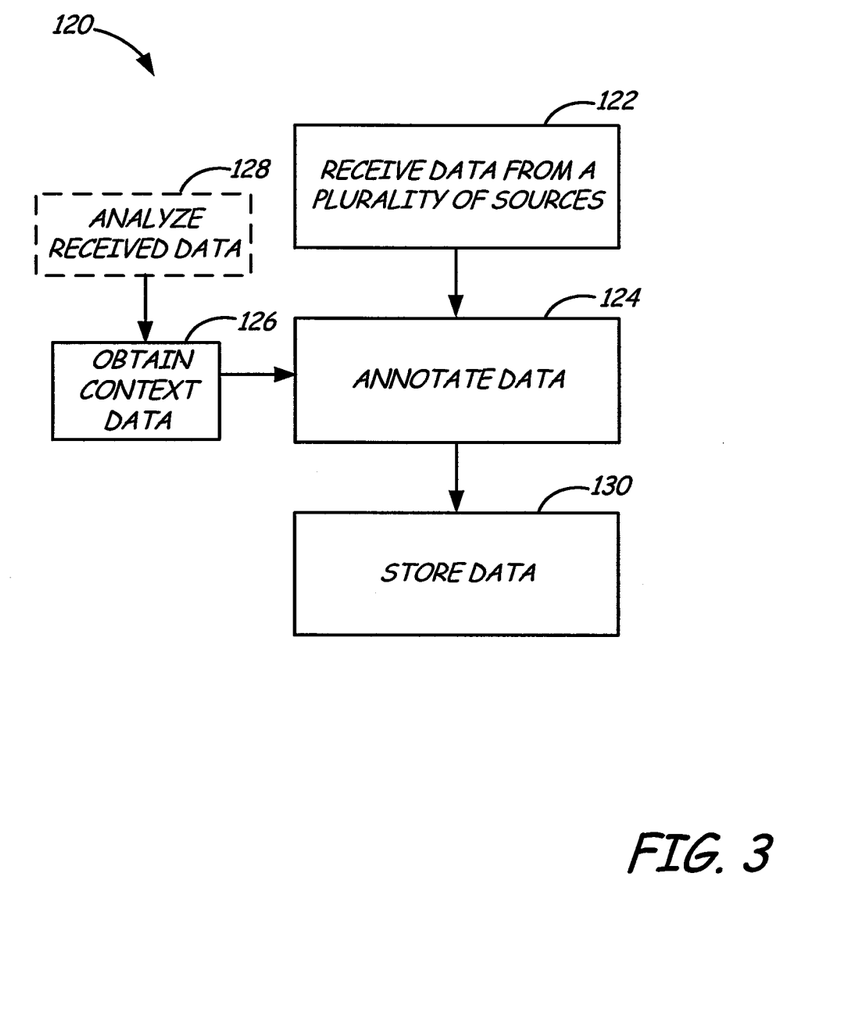
FIG. 3 is a flow diagram illustrating one embodiment of storing social media data.

FIG. 3 illustrates an exemplary method 120 for collecting and storing data from a plurality of sources. For purposes of illustration, but not by limitation, method 120 will be described with respect to the components illustrated in FIG. 1.

At step 122, social media data is received at collection service 104 from one or more social media outlets 102. By way of example, but not limitation, the received social media data can include user profiles, user posts or messages, news clips, audio clips, images, videos, user "likes", social connections or "friends", events, playlists, product "wish lists" or reviews, etc.

In one embodiment, at step 122 the data is obtained by using collection service 104 (or other component) to poll outlets 102 at predefined time intervals (i.e., every 15 minutes, 30 minutes, 1 hour, 1 day, etc.). In another example, polling can take place in response to a condition or input, such as receipt of a message from a media outlet 102 or user input. In another example, the data can be pushed to collection service 104 as it is made available (e.g., posted or published) by a social media outlet 102.

At step 124 the data received at collection service 104 is annotated by annotation tool 106. In the illustrated embodiment, the data is annotated using context information obtained at step 126. In one example, the context information is received from the social media outlet 102 along with, or is otherwise associated with, the data received at step 122. In another example, the context information is optionally obtained by annotation tool analyzing the received data at step 128.

The context information can include, but is not limited to, geographical information, time or date information, user information, and/or information identifying the outlet 102 from which the data is received. In one example, geographical information can identify a geographic location of a subject of the data (i.e., an address of a business mentioned in a user post in a social media network). In one example, geographical information can identify a geographic location where the data was created (i.e., a location of a user that posted a message to a social media network). In one example, time or date information can indicate when the data was received by the respective social media outlet 102 (i.e., when a post was made to a social media network) and/or when the data was received by the collection service 104 from the social media outlet 102. The annotated data is stored to data store 108 at step 130.

Figure 4:
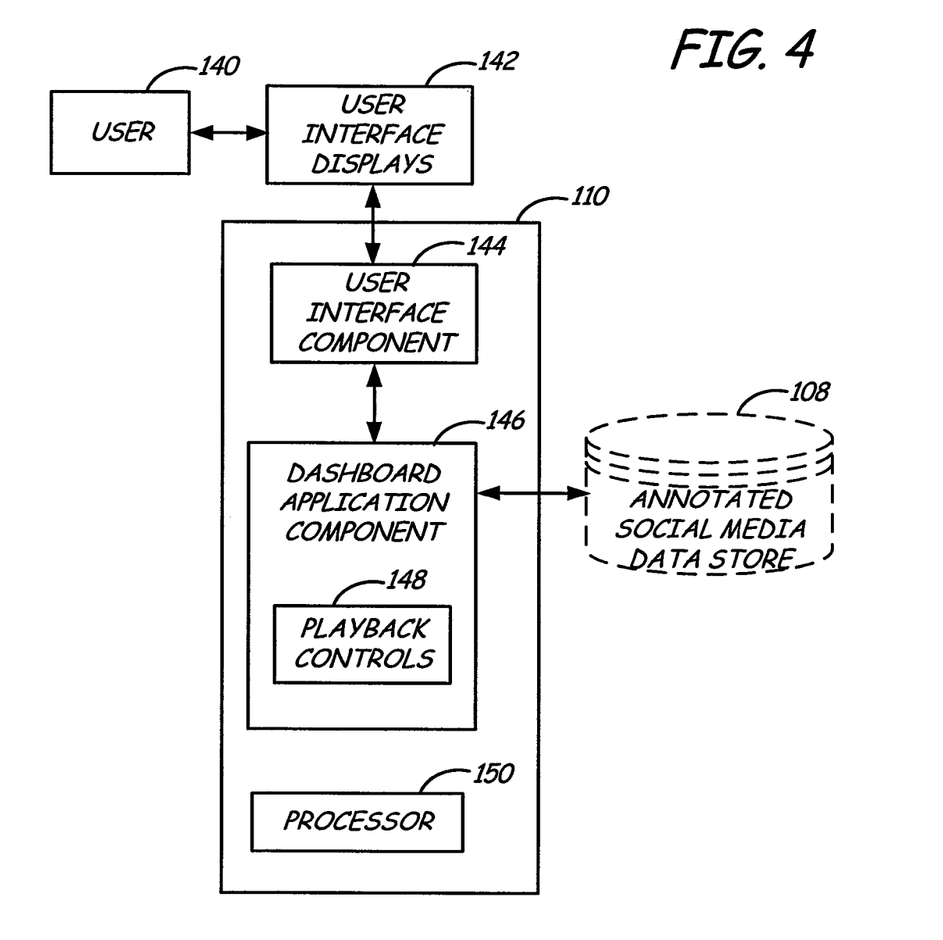
FIG. 4 is a block diagram of one embodiment of a social media playback system.

FIG. 4 is a block diagram of one embodiment of playback system 110. Playback system 110 is shown being accessed by user 140 through user interface displays 142 generated by a user interface component 144. Social media playback system 110 is configured to retrieve and play social media data stored in data store 108. In one example, data store 108 is local to playback system 110, such as residing on a same computing system and/or accessible via a local area network. In another example, data store 108 is remote from playback system 110, such as residing on a remote server and/or accessible via a wide area network.

In the illustrated embodiment, playback system 110 includes a dashboard application component 146 having playback controls 148 that enables user 140 to view the stored social media data in a controlled manner. For example, user 140 can illustratively select a criteria or constraint, such as a time frame or geographic location, for which they desire to view social media data. The dashboard application component 146 then presents the appropriate social media data to user 140 (using user interface component 144) from one or more social media outlets 102 in accordance with the user selected criteria.

In some embodiments, the user interface component 144 allows the user 140 to view the data in the same or similar way in which they would view the same data from social media outlets 102 in real-time. Accordingly, embodiments may be advantageous in that they provide flexibility and options in viewing and analyzing social media data.

In the illustrated embodiment, playback system 110 includes a processor 150 that is illustratively a computer processor with associated memory and timing circuitry (not separately shown). Processor 150 is illustratively a functional part of playback system 110 and facilitates the functionality of other components or systems in playback system 110. In addition, it will be noted that only a single processor 150 is shown by way of example. However, processor 150 could also be a plurality of different processors, in each of the different components or items in playback system 110. Further, all of the items could be implemented as a system on a chip, or otherwise reduced to hardware, and they are shown as separate items for the sake of example only.

Figure 5:
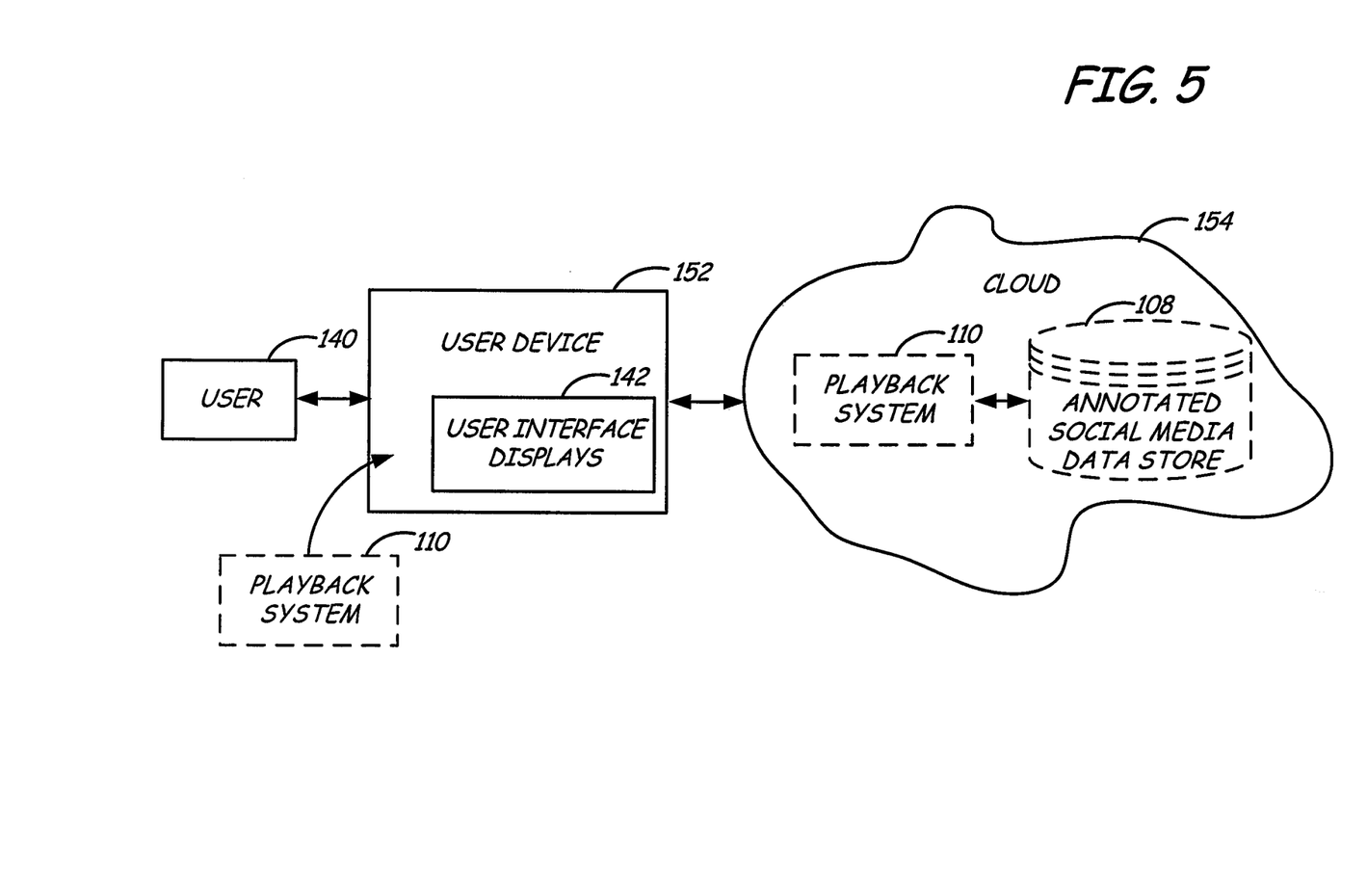
FIG. 5 is a block diagram illustrating one embodiment of a social media playback system in various architectures.

FIG. 5 is a block diagram illustrating embodiments of social media playback system 110 in various architectures. As shown, in one embodiment playback system 110 can reside on a user device 152 that presents user interface displays 142. In one example, but not by limitation, user device 152 comprises a computing device such as personal computer 10 illustrated in FIG. 1.

As also shown in FIG. 5, in one embodiment playback system 110 can reside in a cloud computing architecture 154 that provides data access, storage, and/or computation services. In one example, the services are delivered over a wide area network, such as the Internet, using any suitable communication protocols. For instance, but not limitation, cloud computing architecture 154 can include server(s) or other hardware components residing at one or more locations remote from user device 152 that deliver dashboard application features, software, and/or social media data from data store 108 over a wide area network that can be accessed at user device 152 through a web browser or any other computing component.

While playback system 110 is illustrated in FIGS. 4 and 5 with respect to exemplary system architectures, it is noted that playback system 110, or portions of it, can be disposed on any of a variety of different devices. Examples include mobile devices (e.g. smartphones, music players, personal digital assistants (PDAs), tablet computers, netbooks, notebooks, etc.) or larger, less mobile devices (e.g. a large multitouch screen kiosk, personal computer (PC), server, television, etc.).

Figure 6:
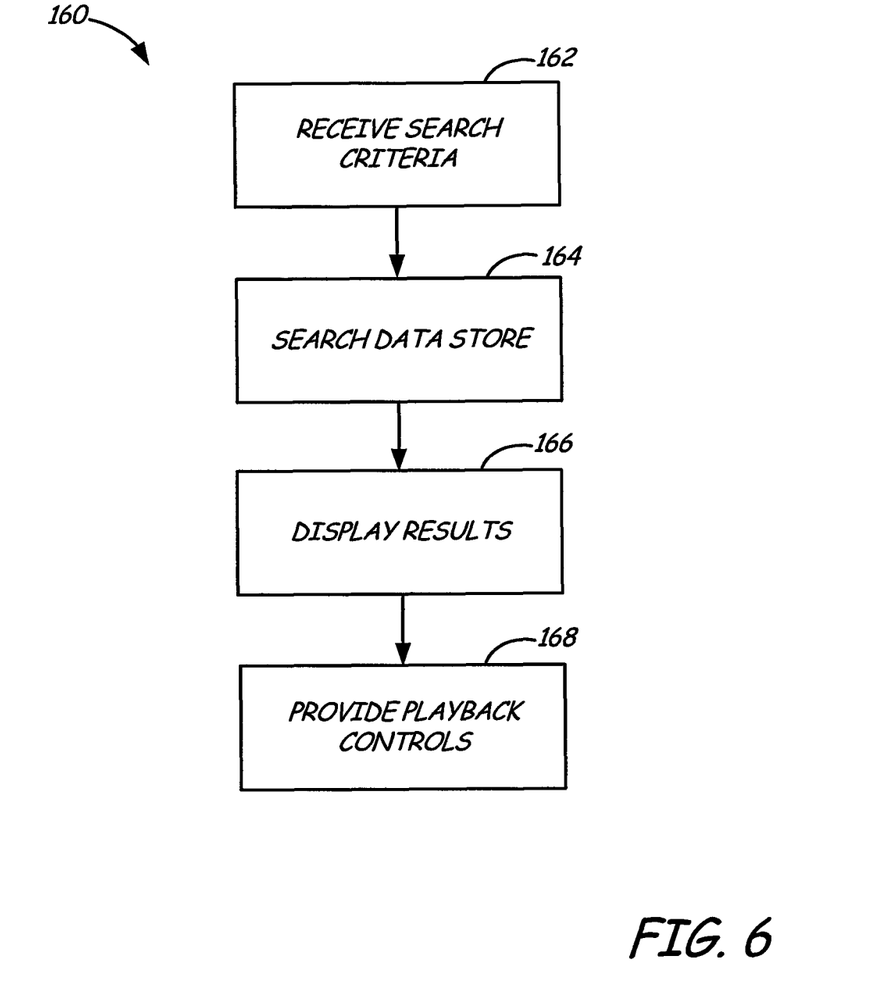
FIG. 6 is a flow diagram illustrating one embodiment of a method for playback of social media data.

FIG. 6 is a flow diagram illustrating an exemplary method 160 for playback of social media data using a playback system. For purposes of illustrates, but not limitation, method 160 will be described with respect to playback system 110 shown in FIG. 4.

At step 162, playback criteria is received. For example, user 140 of playback system 110 can provide search criteria, such as keyword(s), a topic, a store name, a product brand, a person's name, etc., for which they are interested in viewing social media data.

At step 164, the method searches annotated social media data store 108 based on the search criteria. For example, the search criteria can be compared against the social media data and/or associated context data to identify relevant information to present to user 140. The results are presented to user 140 at step 166 via one or more user interface displays 142. For example, in one embodiments step 166 comprises displaying representations of a plurality of messages retrieved by searching the data store at step 164. The representations can include, but are not limited to, the text of each message, a subset or snippet of text, a count of message occurrences or mentions, user information, geographic information, etc. Playback controls can be provided to user 140 at step 168 to allow the user to view the social media data in a controlled manner.

Figure 7:
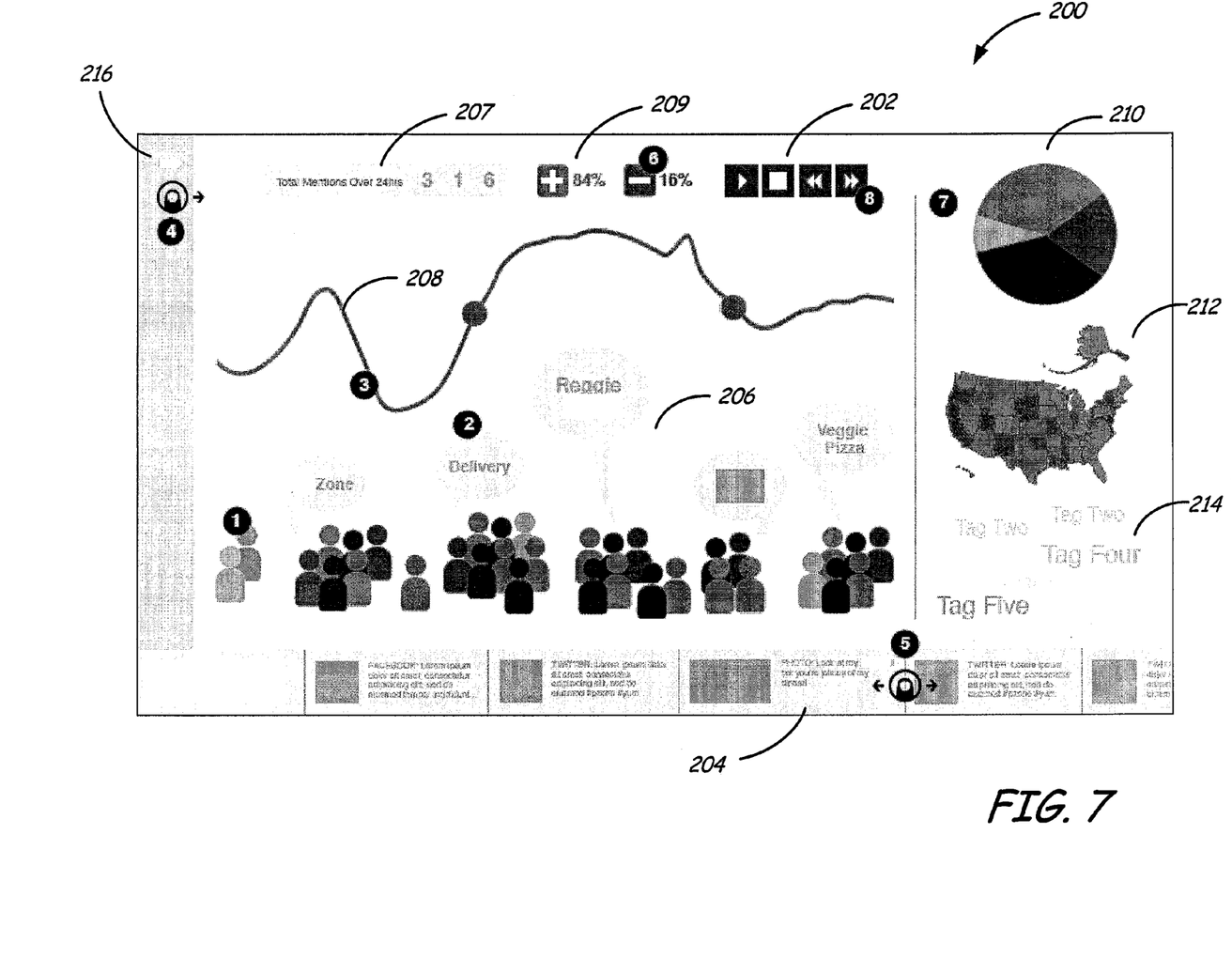
FIG. 7 shows one example of a user interface for a social media data playback system, under one embodiment.

FIG. 7 illustrates one embodiment of a user interface ("UI") 200 for social media data playback system 110 that can be displayed at step 166. User interface 200 is illustratively implemented as part of dashboard application 146 and corresponds to a user search criteria provided at step 162. In the illustrated embodiment, UI 200 includes a plurality of views for the social media data as a function of a number of different characteristics. For example, but not limitation, social media data conglomerated from outlets 102 can be displayed in a first display view as a function of time, in a second display view as a function of geography, in a third display view as a function of the outlet 102 from which the data was obtained, and in a fourth display view as a function of topic.

UI 200 optionally includes a set of playback controls 202. Controls 202 may include user selectable buttons such as, but not limited to, play, stop, pause, forward, fast forward, reverse, fast reverse, slow, previous section, next section, save, delete, etc. Controls 202 illustratively enable a user to control the manner in which the social media is being viewed in UI 200, such as by setting or adjusting a time frame for which social data is being viewed in UI 200. For example, UI 200 may include a ticker section 204 and a topics section 206 that display social media content as a function of context information. Controls 202 can be used to control the manner in which data is shown in sections 204 and 206. A user could for example, pause or stop the display of data, fast forward through data, or go back to a previous time frame.

UI 200 may include a counter section 207 that identifies the current time frame being viewed (e.g. a particular date or time, a previous time period, etc.) and a total number of mentions or occurrences in that time frame. In the illustrated example, 316 occurrences related to a user specified keyword or phrase (e.g., a pizza company name) have occurred in the last 24 hours.

UI 200 may also have a sentiment or KPI section 209 that summarizes the data. For example, section 209 may give a percentage of mentions or occurrences in the social media data for the time frame that are positive (e.g. 84%) and a percentage of mentions or occurrences that are negative (e.g. 16%).

Timeline section 208 optionally shows a timeline or other graphical representation of mentions over time. In the illustrated embodiment, a horizontal axis of the timeline corresponds to time, and a vertical axis of the timeline corresponds to a count or volume of mentions. A user can select a portion of the timeline (e.g., corresponding to a selected date/time) to obtain a focused view of the social media data at the selected date/time. In one example, selecting a point along the timeline can modify the views in sections 204, 206, 209, 210, 212, and/or 214, and/or present additional graphs or charts, to reflect the social media data at the selected date/time.

Topic section 206 illustratively shows trending topics. In one embodiment, groups of people appear to represent trending topics. The people may be color coded (or provided with other visual indicia) to identify an associated media outlet. For instance, one media outlet may be represented by a blue person, and another media outlet may be represented by a purple person. Bubbles having text, images, audio, visual, or other information may be included above the people to identify trending topics.

UI 200 may also include pie chart section 210 that identifies where the social media data is coming from. For example, each slice/segment of the pie chart may be color coded (or provided with other visual indicia) with each color representing one particular social media outlet. Accordingly, a user can view section 210 to get an indication of which media outlet has the greatest amount of mentions, the fewest amount of mentions, etc.

Furthermore, UI 200 may include geographic section 212 and cloud section 214. Geographic section 212 may include a map of a geographic location (e.g. the U.S.) and may be color coded (or provided with other visual indicia) to indicate a characteristic of the social media data (e.g. to represent sentiment, to represent where the social media data is coming from, etc.). For example, different states can be color coded (or provided with other visual indicia) to indicate sentiment or volumetric differences in the social media data from users in those states. Cloud section 214 may show popular or high volume tags, keywords, etc. that occur in the social media data. The tags or keywords in cloud section 214 are selectable to view or obtain additional information.

Ticker section 204 illustratively scrolls (e.g. from right to left) and shows social media data. Each piece of data in section 204 may include an identifier that identifies the associated social media outlet and data that identifies the content of the social media posting (e.g. text, picture, video, or audio information from a Facebook posting, Tweet, etc.). In one embodiment, section 204 shows all of the relevant data. However, in another embodiment, the data shown in ticker 204 may be filtered to only show a subset of the total data. In some embodiments, the data may be filtered to show only the most relevant data, the highest frequency data, data from influential users, data from users with many followers, etc. Embodiments are not however limited to any particular manner of filtering and may be filtered in any way.

UI 200 further optionally includes a menu section 216. It is worth noting that UI 200 is illustratively implemented using a touch (e.g. multitouch screen) such that any of the controls can be activated/selected by a touch gesture. Embodiments however can be implemented using other technologies such as a mouse, keyboard, trackball, etc. Selection of menu section 216 illustratively generates a display of menu options that give a user further options for controlling and viewing social media data.

Figure 8:
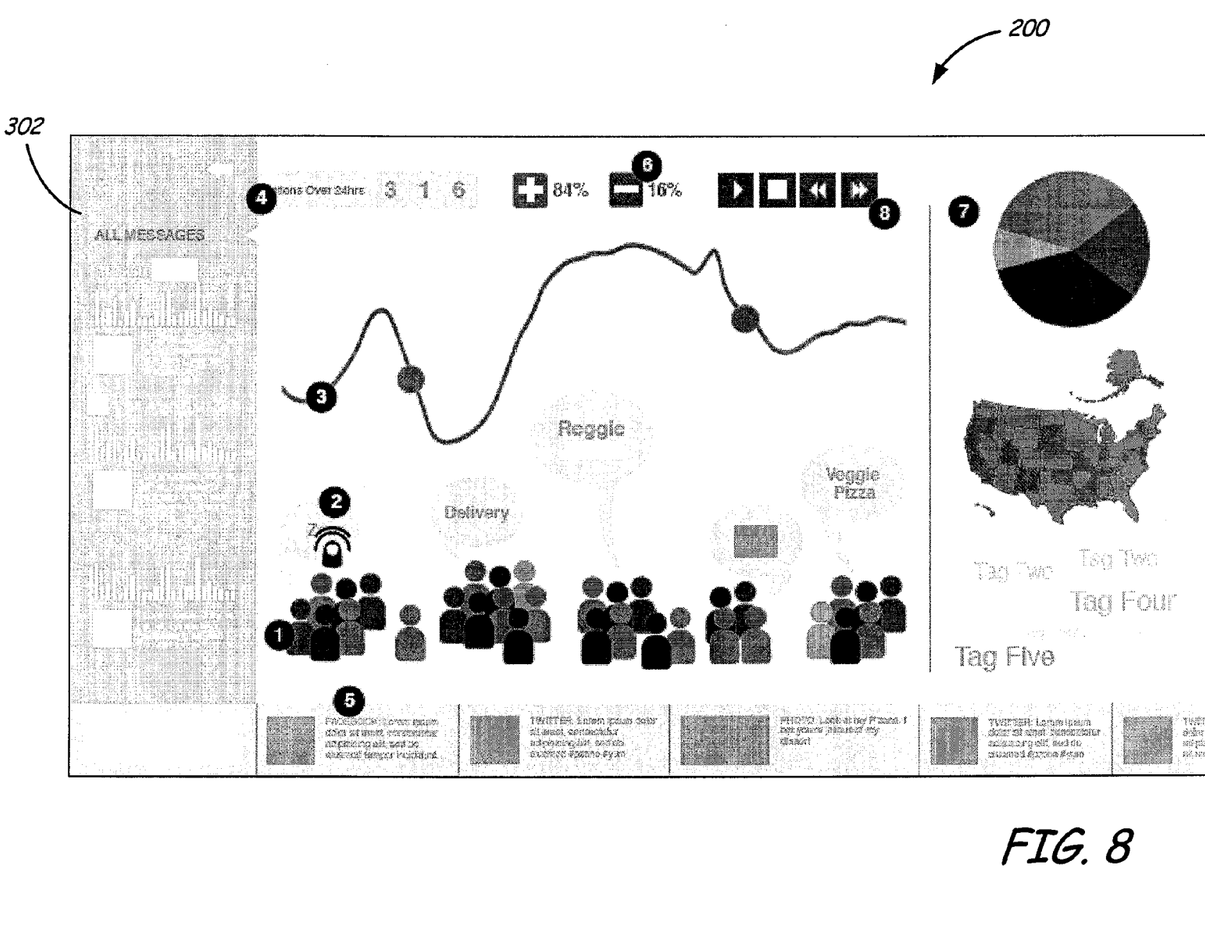
FIG. 8 shows one example of a menu that may be generated upon selection of a menu section, under one embodiment.

FIG. 8 shows one example of a menu 302 that may be generated upon selection of menu section 216 in FIG. 7. In the particular example in FIG. 8, menu 302 shows all of the relevant social media data (e.g. messages). Each of the messages may be further selectable to view additional information about the data (e.g. social media outlet, geographic information, user information, etc.). Furthermore, menu 302 can optionally display other information or provide other features that may be useful in controlling and viewing social media data.

In some embodiments, bookmarking may be used in a social media data playback system. For example, if a user wants to highlight a certain time sensitive set of social media data (e.g. Tweets), the user can bookmark a specific time and give it a name. The user can then go back to the highlighted set of social media data by recalling the bookmark at any point in the future to review the context of what was happening in the social media stream. Bookmarks can optionally be set by a user when they are reviewing data, or users can set bookmarks for particular time frames in the future (e.g. a user could specify a time and day in the future). In one embodiment, bookmarks can be automatically or semi-automatically generated. For instance, a bookmark can be triggered based on certain activity levels. In one example, the system could start recording social media data in the case that a specific social media volume or keyword threshold was met. Additionally, the configuration (e.g. triggering criteria) could be managed/set-up by a user. Accordingly, a user can use bookmarks to record social media data around a certain time frame for later review.

It should be mentioned that any of the above features can be combined in other systems. For example, playback controls (e.g. controls 202 in FIG. 3) and/or bookmarks could be added for instance to any social media data viewing application to enable a user to control the manner in which they view social media data.

Although the present invention has been described with reference to preferred embodiments, workers skilled in the art will recognize that changes may be made in form and detail without departing from the spirit and scope of the invention.

What is claimed is:

1. A computer-implemented method of displaying social media data, the method comprising:
   obtaining, using a processor, social media data having associated context information, the obtained social media data including at least first social media data from a first social media outlet and second social media data from a second social media outlet and the associated context information comprising a time for each item of social media data; and
   providing a user interface that displays:
      a selectable timeline section;
      at least one other section showing a representations of at least one item of the first social media data and a representation of at least one item of the second social media data such that when a new time of the selectable timeline is selected the at least one other section is modified to reflect the content of the first social media data and the second social media data at the selected time.

2. The computer-implemented method of claim 1, and further comprising:
   receiving a user query; and
   obtaining the social media data from a database based on the user query.

3. The computer-implemented method of claim 1, wherein the context information further comprises at least one of:
   a keyword, geographical information, user information, and social media outlet identifying information.

4. The computer-implemented method of claim 1, and further comprising:
   receiving a selection of at least one of the representations; and
   displaying additional information pertaining to the selected representation.

5. The computer-implemented method of claim 1, wherein the at least one other section comprises:
   a first section displaying topics of the first and second social media data; and
   a second section displaying a count of a number of times a term was found in the first and second social media data.

6. The computer-implemented method of claim 1, wherein the at least one other section comprise at least one of:
   a ticker section that displays the obtained social media data temporally beginning from the selected time;
   a geographic section that provides a map showing geographically sources of the first and second social media data;
   a social media outlet section that indicates relative percentages of the obtained social media data that each of a plurality of social media outlets provided;
   a topics section that displays one or more topics related to the obtained social media data beginning at the selected time;
   a counter section that identifies a number of occurrences of a term or keyword within the obtained social media data for a time period;
   a sentiment section that represents user sentiment within the obtained social media data.

7. The computer-implemented method of claim 1, wherein the user interface comprises one or more playback controls for changing the selected time.

8. The computer-implemented method of claim 1, and further comprising:
   establishing a bookmark for the obtained social media data; and
   recalling the obtained social media data using the bookmark.

9. The computer-implemented method of claim 8, wherein the bookmark is set in response to at least one of:
   a user input; and
   a predefined trigger condition.

10. The computer-implemented method of claim 1, wherein the representations of the first and second social media data are displayed in the user interface with visual indicia based on one or more characteristics of the social media data.

11. The computer-implemented method of claim 10, wherein the one or more characteristics comprises at least one of a user sentiment within the social media data, a geographic location associated with the social media data, and the social media outlet from which the social media data was obtained.

12. The computer-implemented method of claim 10, wherein the representations of the first and second social media data are color-coded.

13. A computer readable storage device storing instructions which, when executed by a processor, perform a method comprising:
- displaying a control to select a time frame in a user interface;
- receiving a selection of the control;
- determining a time frame from the selection of the control;
- obtaining social media data comprising messages from at least one social media outlet based on the determined time frame;
- displaying a representation of each message in the user interface together with the control;
- receiving a second selection of the control on the user interface;
- determining a new time frame from the second selection of the control; and
- obtaining and displaying messages from at least one social media outlet based on the new time frame together with the control.

* * * * *